United States Patent
Abado et al.

(10) Patent No.: US 10,733,533 B2
(45) Date of Patent: Aug. 4, 2020

(54) APPARATUS AND METHOD FOR SCREENING DATA FOR KERNEL REGRESSION MODEL BUILDING

(71) Applicant: General Electric Company, Schenectady, NY (US)

(72) Inventors: Shaddy Abado, Lisle, IL (US); Jianbo Yang, San Ramon, CA (US); Xiahui Hu, Foxborough, MA (US); Abhinav Saxena, San Ramon, CA (US); Charmin Patel, Lisle, IL (US)

(73) Assignee: General Electric Company, Schenectady, NY (US)

( * ) Notice: Subject to any disclaimer, the term of this patent is extended or adjusted under 35 U.S.C. 154(b) by 735 days.

(21) Appl. No.: 15/451,601

(22) Filed: Mar. 7, 2017

(65) Prior Publication Data
US 2018/0260733 A1  Sep. 13, 2018

(51) Int. Cl.
G06N 20/00  (2019.01)
G06N 20/10  (2019.01)
G05B 13/04  (2006.01)

(52) U.S. Cl.
CPC ............ *G06N 20/00* (2019.01); *G06N 20/10* (2019.01); *G05B 13/048* (2013.01)

(58) Field of Classification Search
None
See application file for complete search history.

(56) References Cited

U.S. PATENT DOCUMENTS

| | | | | |
|---|---|---|---|---|
| 7,679,504 B2* | 3/2010 | Wang | ................... | A61B 5/0205 340/506 |
| 9,282,008 B2* | 3/2016 | Shah | ........................ | H04L 67/10 |
| 9,306,966 B2* | 4/2016 | Eskin | ...................... | G06F 16/84 |
| 9,347,432 B2* | 5/2016 | Herrig | ................... | F03D 7/0296 |
| 10,204,226 B2* | 2/2019 | Bushey | ................... | G06F 21/57 |
| 10,242,443 B2* | 3/2019 | Hsieh | ....................... | G06N 3/04 |
| 10,423,788 B2* | 9/2019 | Keromytis | .......... | G06F 11/3688 |

(Continued)

OTHER PUBLICATIONS

Robert Burbidge, "Stopping Criteria for SVMS", 2002. pp. 1-5 (Year: 2002).*

Amer et al.—"Enhancing One-class Support Vector Machines for Unsupervised Anomaly Detection", 2013, ODD, pp. 8-15 (Year: 2013).*

(Continued)

*Primary Examiner* — Paulinho E Smith

(74) *Attorney, Agent, or Firm* — Fitch Even Tabin & Flannery LLP

(57) ABSTRACT

Raw data is received from an industrial machine. The industrial machine includes one or more sensors that obtain the data, and the sensors transmit the raw data to a central processing center. The raw data is received at the central processing center and an unsupervised kernel-based algorithm is recursively applied to the raw data. The application of the unsupervised kernel-based algorithm is effective to learn characteristics of the raw data and to determine from the raw data a class of acceptable data. The class of acceptable data is data having a degree of confidence above a predetermined level that the data was obtained during a healthy operation of the machine. The acceptable data is successively determined and refined upon each application of the unsupervised kernel-based algorithm. The unsupervised kernel-based algorithm is executed until a condition is met.

24 Claims, 7 Drawing Sheets

(56) References Cited

U.S. PATENT DOCUMENTS

| | | | | |
|---|---|---|---|---|
| 2010/0153785 | A1* | 6/2010 | Keromytis | G06F 11/08 |
| | | | | 714/38.11 |
| 2012/0023062 | A1* | 1/2012 | Vashist | G06N 20/00 |
| | | | | 706/59 |
| 2016/0328654 | A1* | 11/2016 | Bauer | G06N 5/048 |
| 2018/0053400 | A1* | 2/2018 | Abado | G05B 23/0224 |
| 2018/0129714 | A1* | 5/2018 | Saxena | G05B 19/0428 |
| 2018/0260733 | A1* | 9/2018 | Abado | G06N 20/00 |
| 2019/0041078 | A1* | 2/2019 | Harpale | F24F 11/38 |
| 2019/0086911 | A1* | 3/2019 | Xin | G05B 23/0251 |

OTHER PUBLICATIONS

Amer, Mennatallah, et al., "Enhancing One-class Support Vector Machines for Unsupervised Anomaly Detection." ODD '13 Proceedings of the ACM SIGKDD Workshop on Outlier Detection and Description, Aug. 11, 2013, pp. 8-15.

Costa, Bruno Sielly Jales, et al., "Fully Unsupervised Fault Detection and Identification Based on Recursive Density Estimation and Self-Evolving Cloud-Based Classifier." Neurocomputing, Oct. 2014, pp. 1-26.

He, Jingrui, et al., "Pseudo Relevance Feedback Based on Iterative Probabilistic One-Class SVMs in Web Image Retrieval." Proceeding PCM '04 Proceedings of the 5th Pacific Rim Conference on Advances in Multimedia Information Processing—vol. Part II, 2004, pp. 213-220.

Pei, Yaling, et al., "An Efficient Reference-based Approach to Outlier Detection in Large Datasets." Sixth International Conference on Data Mining (ICDM '06), 2006, 10 pages.

Scholkopf, Bernhard, et al., "Estimating the Support of a High-Dimensional Distribution." Microsoft Research Technical Report MSR-TR-99-87, Nov. 27, 1999, pp. 1-30.

Suvorov, Mikhail, et al., "OSA: One-Class Recursive SVM Algorithm with Negative Samples for Fault Detection." Springer-Verlag, Berlin Heidelberg, 2013, pp. 194-207.

Random forest from Wikipedia. <https://en.wikipedia.org/wiki/Random_forest>, accessed at least prior to Mar. 7, 2017, 6 pages.

* cited by examiner

APPARATUS AND METHOD FOR SCREENING DATA FOR KERNEL REGRESSION MODEL BUILDING

BACKGROUND OF THE INVENTION

Field of the Invention

The subject matter disclosed herein generally relates to kernel regression model building and, more specifically, to screening data for use in kernel regression model building.

Brief Description of the Related Art

Various types of industrial machines are used to perform various manufacturing operations and tasks. Other machines can be used for other tasks, e.g., power generation. For instance, some machines are used to create and finish parts associated with wind turbines. Other machines are used to create mechanical parts or components utilized by vehicles. Still other machines are used to produce electrical parts (e.g., resistors, capacitors, and inductors to mention a few examples). Typically, industrial machines are controlled at least in part by computer code (or a computer program) that is executed by a processor located at the machine.

The industrial machines typically have sensors (or "tags") associated with them. The sensors typically measure various physical quantities such as temperature and pressure. The measured values may relate to the quality of operation of the machine or characteristics of the product/process created by the machine. The sensors produce vast quantities of time series data.

The operation of the machines can be modelled using mathematical equations, algorithms, and relationships. In order to model this operation, data is sometimes selected to build the model.

Current approaches for selecting the data have several drawbacks. For instance, selection of nominal data from all available operational data for model building is labor-intensive and requires domain knowledge. Human subject matter experts (SME) have to manually label segments of data where the machine is understood to be operating normally. Additionally, human operators cannot process multiple dimensions manually. Current manual approaches can also be inaccurate and lack the capability to process and screen data from high-dimensional view point. Furthermore, current approaches are typically non-repeatable (i.e., same person may supply different results) and non-standardized (i.e., different persons give different results based on subjective judgements). All of these problems have led to user dissatisfaction with current approaches.

BRIEF DESCRIPTION OF THE INVENTION

The present invention is directed to utilizing machine algorithms in a recursive mode to automatically select a subset of reference data from the raw historical data of an industrial equipment and processes. These approaches supply a data set that can be utilized by any data-driven modeling approaches where building personalized models of industrial equipment is needed.

The present approaches supply an end-to-end solution that takes the raw historical data as the input and generates the reference data to be used for personalized asset model building as the output. These approaches reduce implementation time and reduce the possibility of training bad data into the data-driven model. Additionally, the approaches presented herein are highly configurable and adaptive to satisfy various user needs and accommodate different reference data selection strategies. These approaches are also unsupervised in identifying good data quality while minimizing the dependency on domain knowledge.

In some aspects, a recursive one-class SVM algorithm adapted from popular one-class SVM algorithm is utilized. The algorithm may be multi-variate, unsupervised, utilize parameter-free decision function (e.g., no knobs for human to tune), and can adapt to human preference on aggressive or conservative selection.

In other aspects, these approaches automatically account for various operational modes without needing explicit labeling and identify nominal in multi-variate space often not apparent to humans. However, if so preferred, the approaches described herein also accept SME user input (e.g., domain input). Users can manually specify examples of good/bad data to learn from and can specify relative importance weightage of sensors. In examples, users can specify valid limits on sensor values. These approaches can easily be adapted to various conditions by operation in various configuration settings. In one specific example, three basic settings are provided (e.g., aggressive, moderate, and conservative) for utilizing these approaches. Other examples of settings are possible.

In many of these embodiments, raw data is received from an industrial machine. The industrial machine includes one or more sensors that obtain the data, and the sensors transmit the raw data to a central processing center. The raw data is received at the central processing center and an unsupervised kernel-based algorithm is recursively applied to the raw data. The application of the unsupervised kernel-based algorithm is effective to learn characteristics of the raw data and to determine from the raw data a class of acceptable data for model building. The class of acceptable data is data having a degree of confidence above a predetermined level that the data was obtained during a healthy operation of the machine. The acceptable data is successively determined and refined upon each application of the unsupervised kernel-based algorithm. The unsupervised kernel-based algorithm is recursively executed until a stopping condition is met.

In aspects, the kernel based algorithm is a one-class SVM algorithm. Other examples of algorithms are possible.

In other examples, the stopping condition is an integer number of application times. In still other examples, the condition relates to reaching a predetermined number of data points in the refined set. In yet other examples, the condition relates to a number of iterations, where the number of iterations is adjustable between a first number representing a first level of aggressiveness and a second number representing a second level of aggressiveness.

In still other aspects, user provided information concerning data quality that identifies at least some acceptable data is received. In other examples, the raw data can be preprocessed before applying the unsupervised kernel-based algorithm. In yet other examples, user provided limits on range of data concerning the raw data are accepted.

In other of these embodiments, an apparatus that is disposed at a central processing center includes a receiver circuit, a data storage device, and a control circuit.

The receiver circuit is configured to receive raw data from sensors at an industrial machine. The industrial machine includes one or more sensors that obtain the data.

The data storage device is coupled to the receiver circuit. The data storage device is configured to store the raw data.

The control circuit is coupled to the data storage device and the receiver circuit, the control circuit configured to receive the raw data and to recursively apply an unsupervised kernel-based algorithm to the raw data. The application of the unsupervised kernel-based algorithm is effective to learn characteristics of the raw data and to determine from the raw data a class of acceptable data the class of acceptable data being data having a degree of confidence above a predetermined level that the data was obtained during a healthy operation of the machine. The acceptable data is successively determined and refined upon each application of the unsupervised kernel-based algorithm. The unsupervised kernel-based algorithm is executed until a condition is met.

BRIEF DESCRIPTION OF THE DRAWINGS

For a more complete understanding of the disclosure, reference should be made to the following detailed description and accompanying drawings wherein.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE INVENTION

In the present approaches, recursive machine algorithms are executed to automatically select (or screen) a subset of reference data from raw historical data obtained from an industrial equipment and/or industrial process. These approaches effectively perform data "striping" of the raw data into healthy (good) data and unhealthy (bad) data. Once screened, other processes can utilize the data to determine the health of industrial machines and predict faults in these machines.

Figure 1:
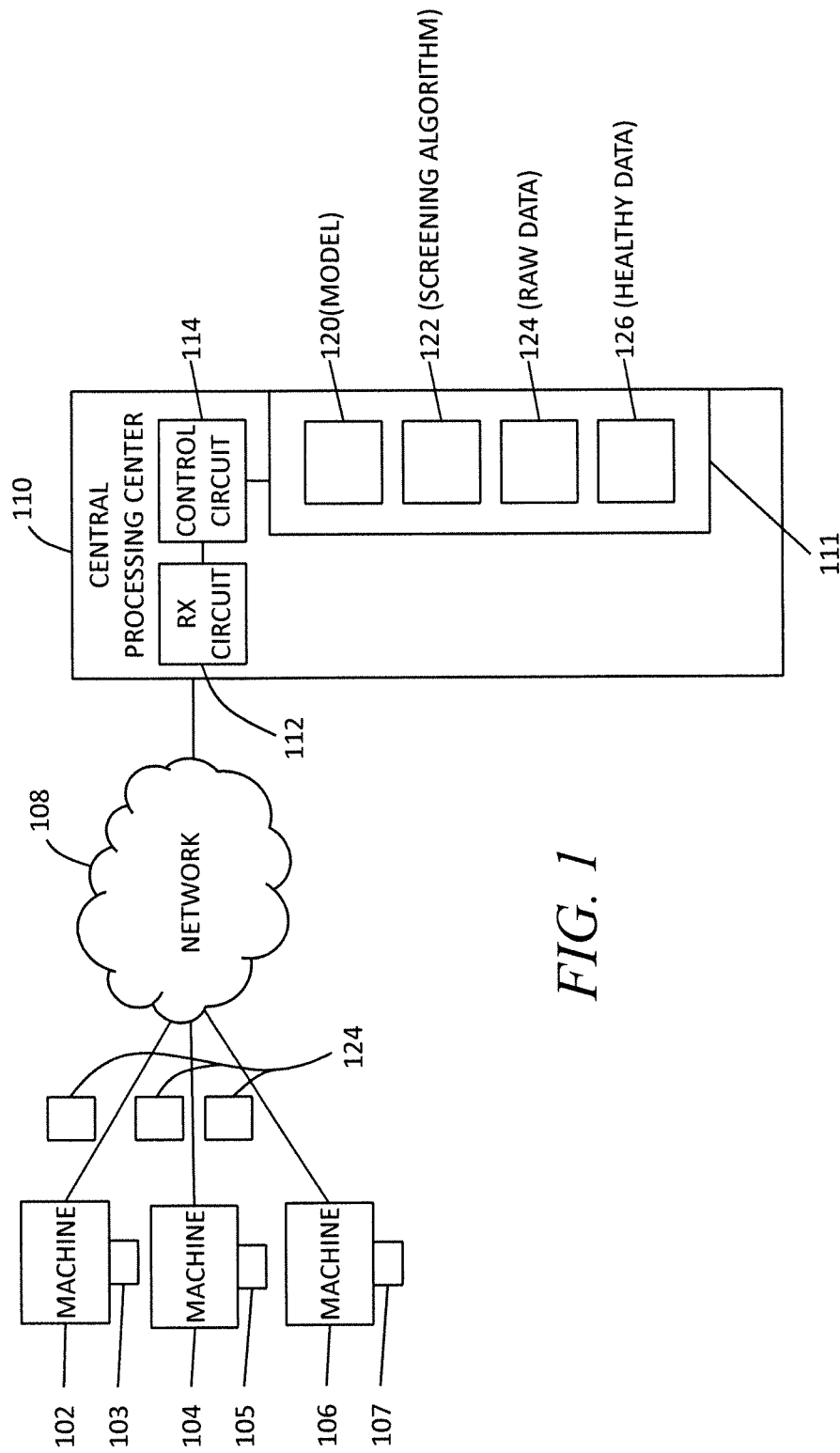
FIG. 1 comprises a block diagram of a system for screening data according to various embodiments of the present invention.

Referring now to FIG. 1, one example of a system for screening data is described. The system includes industrial machines 102, 104, and 106 with tags or sensors 103, 105, and 107. The industrial machines 102, 104, and 106 may be any type of machine such as a tools, mixers, boilers, generators, milling machines, and grinders to mention a few examples. The tags (sensors) 103, 105, and 107 are data sources on (or at) the industrial equipment and are identified by tag names and/or tag IDs. The machines 102, 104, and 106 may be located at a factory, office, campus, or any other location or combination of locations. The machines 102, 104, and 106 may operate according to multiple operation modes (e.g., various running conditions of the physical machine, such as no load (idle), full load, or part load).

Raw data 124 is collected from the sensors (tags) 103, 105, 107. By "raw" data, it is meant that no data processing has been applied to the data after the data has been physically sensed.

Raw data 124 is transmitted over a network 108 to a central processing center 110. The central processing center 110 includes a receiver circuit 112, a control circuit 114, and a data storage device 116. The central processing center 110 may be located at a home, at an office, at a headquarters building, or at a service provider to mention a few examples. The central processing center 110 may be located at any geographic location, but is physically separate from the machines 102, 104, and 106.

The network 108 may be any type of network (e.g., the cloud) or any combination of networks (e.g., the cloud, the Internet, and so forth). The receiver circuit 112 and the control circuit 114 may be implemented as any combination of computer software and/or hardware such as by microprocessors executing computer instructions. The data storage device 116 is any type of memory storage device.

The data storage device 116 stores a model (or algorithm) 120. The model 120 is used to make failure predictions concerning the machines 102, 104, and 106. The model 120 is built by the control circuit 114, which observes system behavior and analyzes the generated raw data 124. Alternatively, the model 120 can be built by understanding the physics of how the system operates.

Generally speaking, the model 120 is a numerical representation of the physical behavior of one or more of the industrial machines 102, 104, and 106. In aspects, the model 120 is generally represented as one or more mathematical equations describing the nominal system behavior (where the system is the operation of one or more of the machines 102, 104, and 106).

In some examples, the model 120 is a machine learning model (algorithm). For instance, the model 120 is developed by automatically analyzing large amounts of the raw data 124 (also referred to herein as training data) utilizing mathematical (and/or statistical) algorithms. Advantageously, the model 120 may be an unsupervised machine learning model built by the control circuit 114 solely from raw data 124 (obtained by the machines 102, 104, and/or 106) without any external assistance (from a human user) in identifying good or bad examples (labels). In some aspects, the model 120 is not aware of the correct classification (good or bad) for a given training data point. This is distinguished from the case of semi-supervised models (i.e., models built from data where some (but not all) training data points are labeled by experts with correct classification of good or bad examples), and supervised models (models built from data where all training data points are labeled by experts to identify good and bad examples).

As mentioned, raw or training data 124 from the machines 102, 104 and/or 106 is used by the control circuit 114 for building/training the model 120 (e.g., a machine learning algorithm). The data 124 may include historical data obtained from the system of interest (obtained from the machines 102, 104 and/or 106). On the other hand, testing data is data not used for training but to test performance of the trained model 120 on unseen data. The raw or training data 124 may be multivariate/multi-dimensional data, which is data with more than one variables/attributes sharing a common timestamp (e.g., distinguished from univariate/single-dimensional data). For instance and in a typical machine there can be a number of temperature, pressure, and vibration sensors that simultaneously generate a multivariate data.

The raw or training data 124 from the machines 102, 104, and 106 is screened by a screening algorithm 122 such that only healthy data (or such that substantially only healthy data) is supplied to or utilized by the model 120. In this way, the model 120 is built using only healthy (good) data (or with substantially only good data) resulting in more accurate fault predictions.

In one example of the operation of the system of FIG. 1, the receiver circuit 112 is configured to receive the raw data 124 from the sensors 103, 105, and 107 at one or more of the industrial machines 102, 104, and 106. The data storage device 116 is configured to store the raw data 124.

The control circuit 114 configured to obtain the raw data 124 from the data storage device 116 and to recursively apply the data screening algorithm 122, in this case, an unsupervised kernel-based algorithm, to the raw data 124. The application of the unsupervised kernel-based algorithm 122 is effective to learn characteristics of the raw data 124 and to determine from the raw data a class (or set) of healthy or acceptable data 126.

The class of acceptable data 126 is data having a degree of confidence above a predetermined level that the data was obtained during a healthy operation of the machines 102, 104, and/or 106 and is used by the model 120 to perform various function such as predicting machine health and future failures in the machines 102, 104, and 106. The acceptable data set 126 is successively determined and refined upon each application of the unsupervised kernel-based screening algorithm 124.

The unsupervised kernel-based algorithm 122 is executed on the data set 126 until a condition is met. In examples, the condition is an integer number of application times. In still other examples, the condition relates to reaching a predetermined number of data points in the data that is being considered by the algorithm 122. In yet other examples, the condition relates to a number of iterations, and the number of iterations is adjustable between a first number representing a first level of aggressiveness and a second number representing a second level of aggressiveness.

In aspects, the screening algorithm 122 is a one-class SVM algorithm. Other examples of algorithms are possible. Further details concerning one-class SVM algorithms are described elsewhere herein.

In other aspects, user information concerning data viability that identifies at least some acceptable data is received by the control circuit 114. In other examples, the raw data 124 can be preprocessed before applying the unsupervised kernel-based algorithm. For example, data that is clearly invalid can be discarded. In yet other examples, user specified limits concerning the raw data 124 are accepted.

Figure 2:
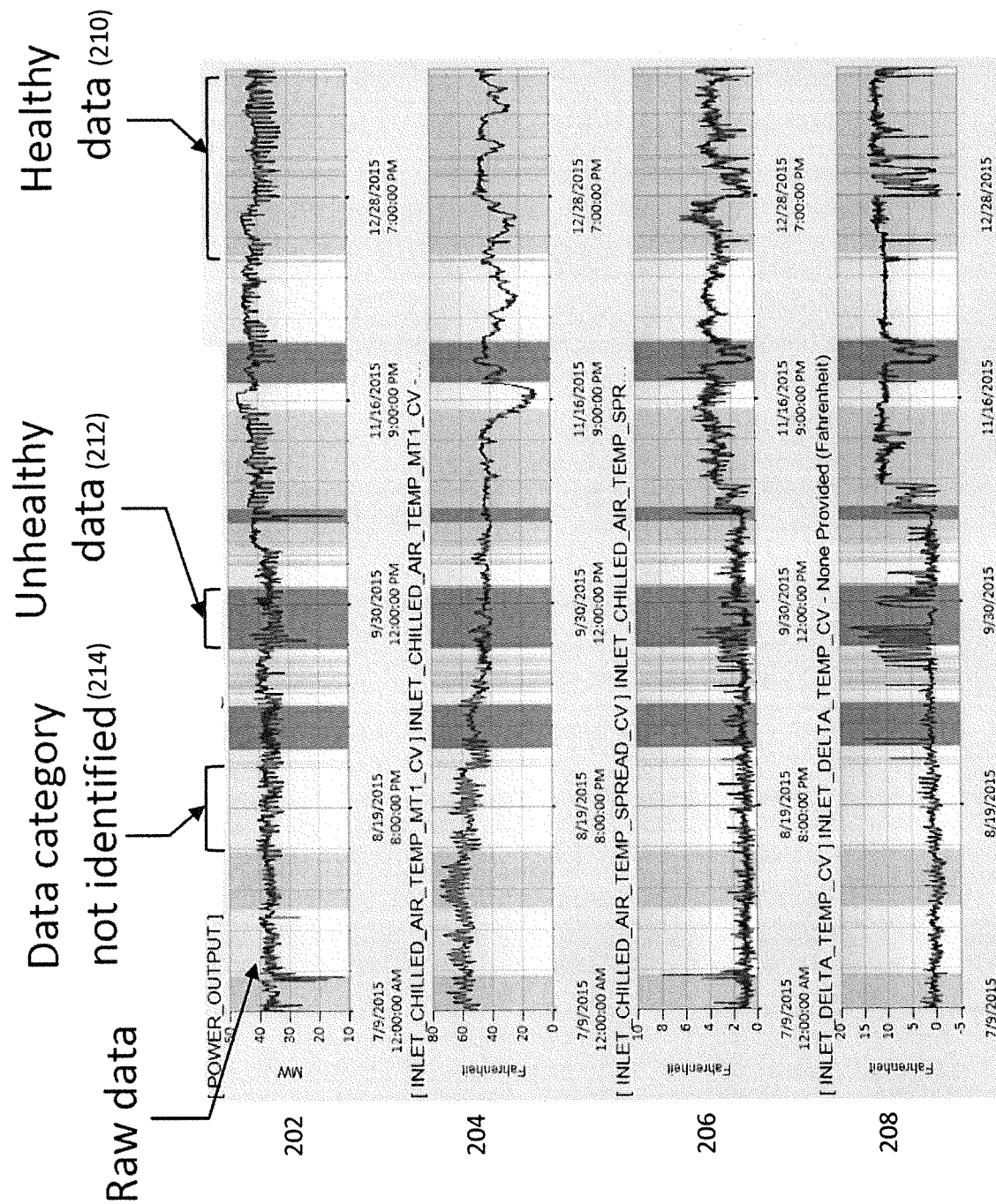
FIG. 2 comprises graphs showing the results of screening data according to various embodiments of the present invention.

Referring now to FIG. 2, one example of results obtained by applying the present is described. The example of FIG. 2 shows data striping. As used herein "data striping" refers to the process of marking data as good quality (e.g., green) or bad quality (e.g., red). "Green striped data" is normal or good quality data marked by a human or an algorithm. "Red striped data" refers to abnormal data or bad quality data marked by a human or an algorithm.

Four sensors 202, 204, 206, 208, and 210 obtain data from industrial machines. The x-axis represents time, and the y-axis represents the magnitude of the data. The data may be of any category or parameter such as pressure or temperature. Other examples are possible.

The data obtained from the machines is raw data. In aspects, the approaches described herein are used to identify and/or group healthy (green-stripe) data 210, unhealthy (red striped data) 212, and unclassified data 214. Once the data has been classified, it can be used, for example, by predictive models to predict failures in industrial machines.

Figure 3:
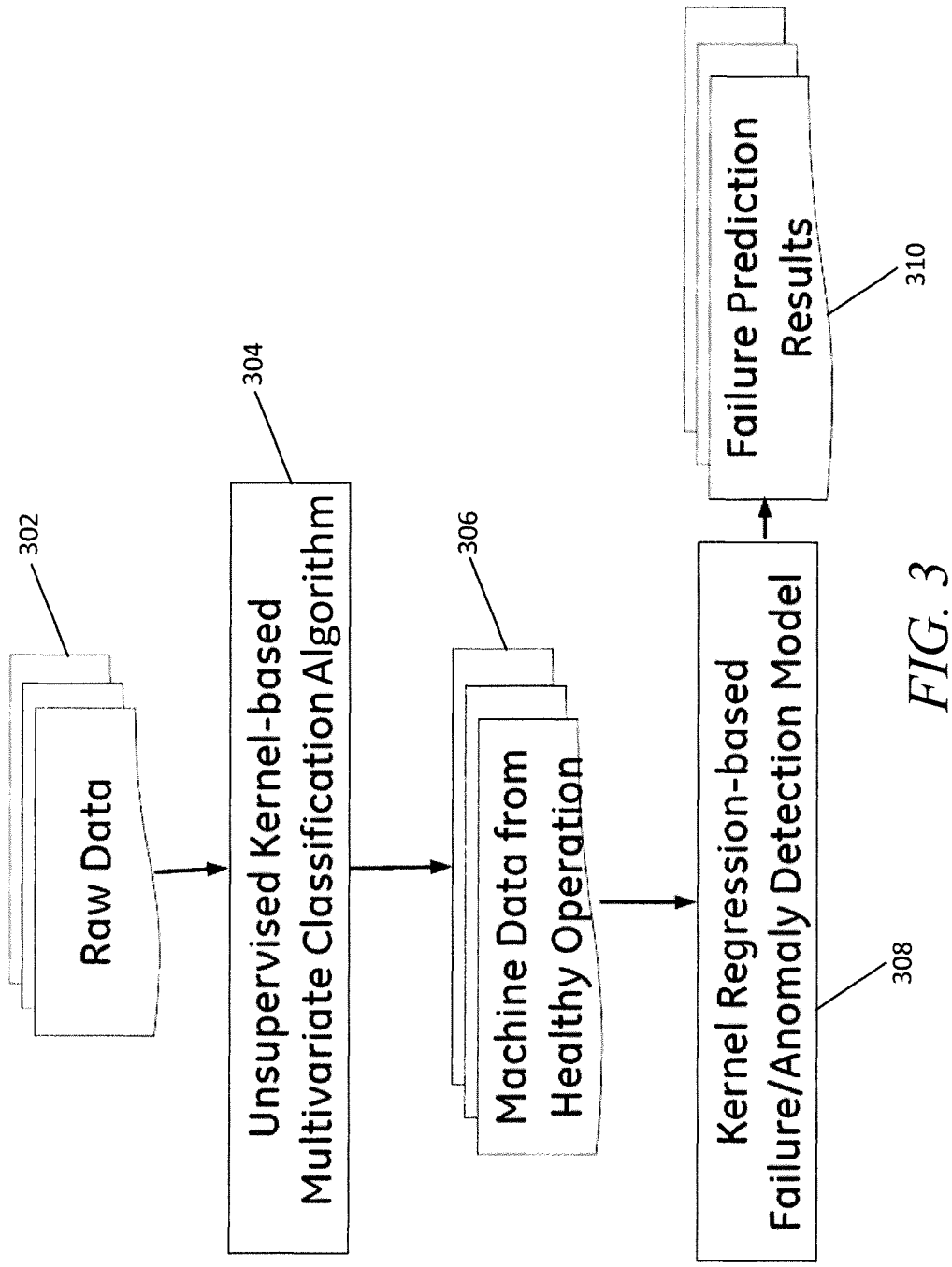
FIG. 3 comprises a flowchart of an approach to use data screening according to various embodiments of the present invention.

Referring now to FIG. 3, one example of an approach to utilize the approaches herein is described. Raw data is received at step 302. The raw data is obtained from sensors at industrial machines.

An unsupervised kernel-based multivariate algorithm 304 is recursively applied to the raw data to produce healthy operation machine data 306. Pre-processing may also be applied to the raw data before application of the unsupervised kernel-based multivariate algorithm 304, for example, to remove corrupt data. Additionally, in scenarios where the amount of unhealthy data is known to be approximately equal to or to greatly exceed the amount of healthy data, a user may enter known examples of healthy and/or unhealthy data such that the raw data can be identified as healthy or unhealthy before application of the unsupervised kernel-based multivariate algorithm 304.

After application of the unsupervised kernel-based multivariate algorithm 304, the healthy data 306 is used by a kernel regression-based failure anomaly detection model 308 to produce failure prediction results 310, which indicate or predict faults or failures in machine operation. Various kernel regression-based failure anomaly detection models and algorithms are well-known to those skilled in the art.

Figure 4:
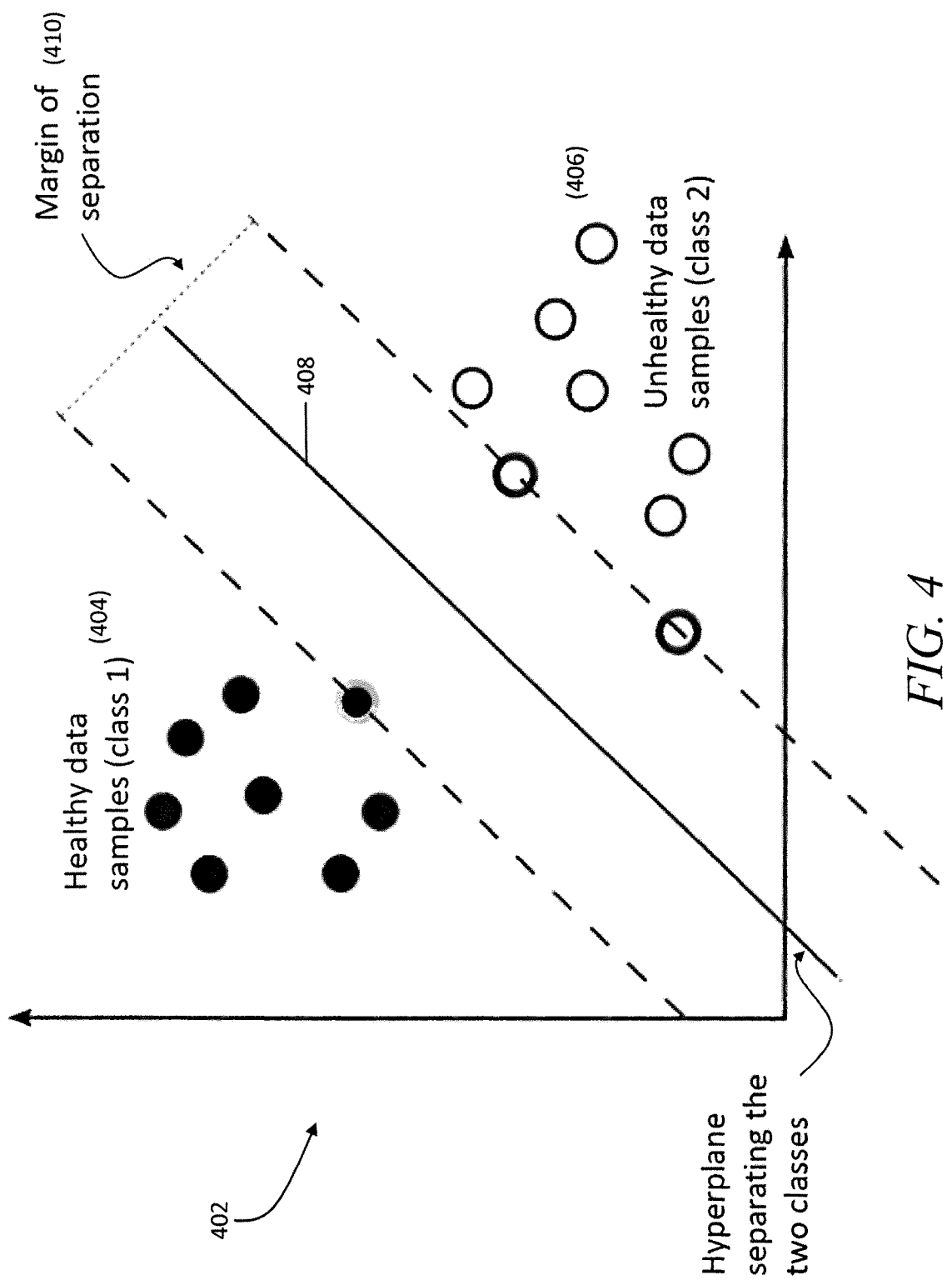
FIG. 4 comprises a graph showing application of a support vector machine (SVM) data screening algorithm according to various embodiments of the present invention.

Referring now to FIG. 4, an example of a Support Vector Machine (SVM) screening algorithm (model) is described. SVM algorithms are machine learning algorithms that learn how to separate given data into two classes by automatically learning the distinguishing features in the dataset. More formally, it is a mathematical model to automatically learn a maximum-margin hyperplane in kernel space to separate two classes of data based on the maximum margin criterion. A kernel is a mapping function that transforms an original data sample (multivariate/multidimensional) into a vector in a higher dimensional or infinite dimensional space, where the separation between classes becomes clearer. RBF kernel is a radial basis function kernel and is one type of kernel function. In one example, the RBF kernel is represented by:

$$K(\vec{x}, \vec{y}) = \exp^{-\frac{\|\vec{x}-\vec{y}\|^2}{h}}$$

Where $\vec{x}$ and $\vec{y}$ are two exemplars, and h is the kernel "bandwidth". It can map a data sample from original space to a vector in infinite dimensional space. The data sets described herein are typically multivariate, multidimensional data. However, other examples are possible. The standard SVM model is a supervised model.

As shown in FIG. 4, a dataset 402 includes first samples 404 and second samples 406. A SVM Hyperplane 408 is the boundary to separate the two classes of data 404 and 406 in multidimensional space. This boundary can be expressed by a mathematical formula referred to as a decision function. When the value of decision function is greater than zero, the corresponding data sample belongs to one of the classes 404 or 406. Otherwise, the data sample belongs to the other class 404 or 406.

A margin 410 is the distance between the hyperplane 408 and the each of two classes of data 404 and 406. A large margin indicates that two classes are well separated, and it is preferred to find a margin that maximizes this separation. The maximum margin hyperplane is the hyperplane with the maximum margin.

Figure 5:
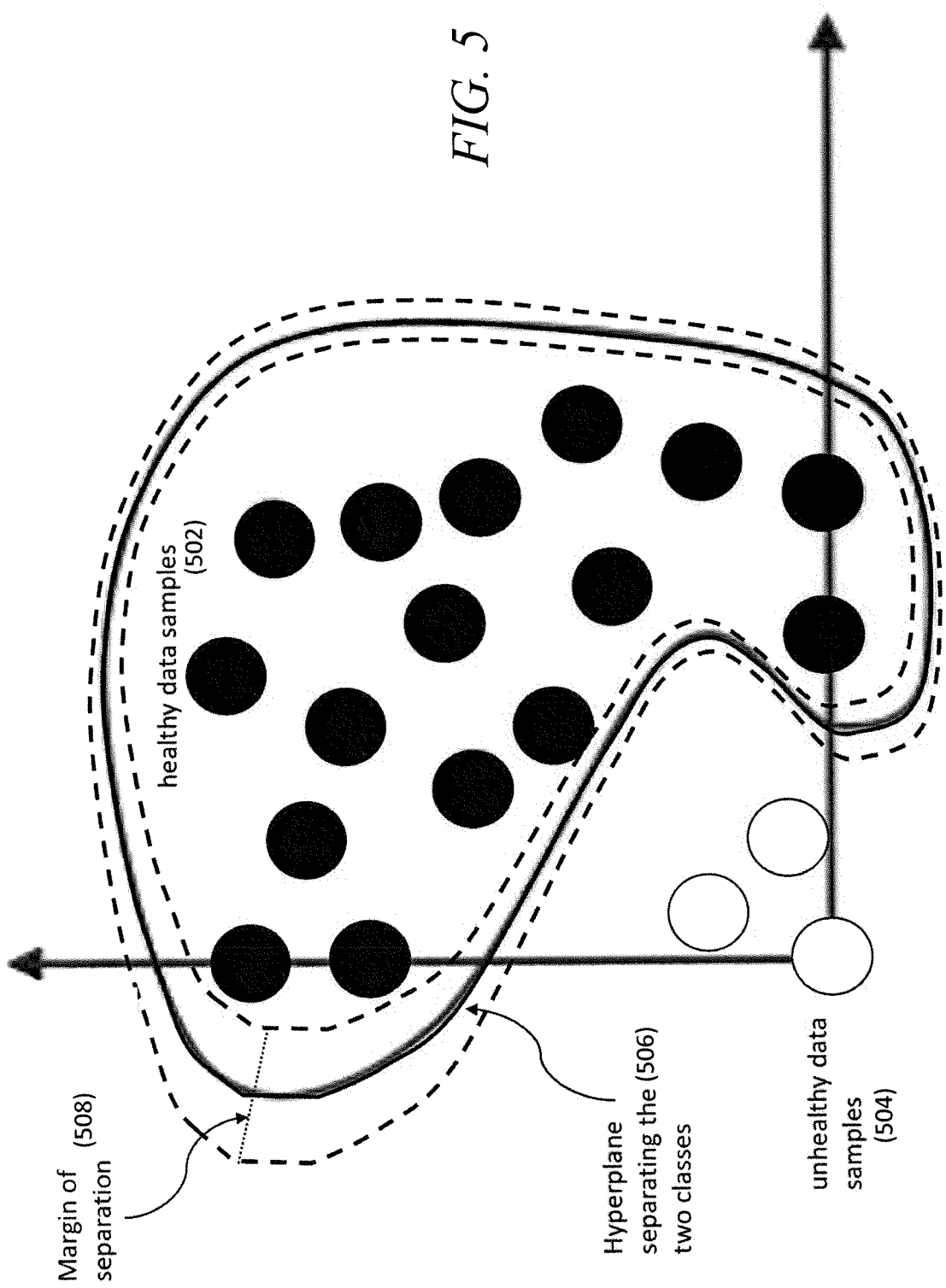
FIG. 5 comprises a graph showing the application of a one-class SVM data screening algorithm according to various embodiments of the present invention.

Referring now to FIG. 5, a one-class SVM screening algorithm is described. This algorithm is a variant of SVM algorithm (model). The algorithm assumes that data belong to a single (normal) class 502 and hence the goal is to find that normal class by separating any outliers 504 that may not belong to that class. For example and in industrial context, it is reasonable to expect that from a long history of data majority data are from nominal operation and only a fraction might come from anomalous operation. It will be appreciated that one-class SVM algorithms are unsupervised models. In other words, users do not have to provide the labels of healthy (good) samples and unhealthy (bad) samples, and outliers in the given dataset.

Also, shown in FIG. 5 are a hyperplane 506 and a margin 508. The hyperplane 506 is the boundary to separate the two classes of data 502 and 504 in multidimensional space. This boundary can be expressed by a mathematical formula referred to as a decision function. When the value of decision function is greater than zero, the corresponding data sample belongs to one of the classes 502 or 504. Otherwise, the data sample belongs to the other class 502 or 504.

The margin 508 is the distance between the hyperplane 506 and the each of two classes of data 502 and 504. A large margin indicates that two classes are well separated, and it is preferred to find a margin that maximizes this separation. The maximum margin hyperplane is the hyperplane with the maximum margin.

As described herein, the one-class SVM algorithm is operated or run recursively on raw data. In other words, the one-class SVM algorithm is run in a recursive manner so at each step additional data are discarded as outliers based on a more refined model of nominal. The algorithm may be operated aggressively or conservatively. When operated aggressively, more data points may be dropped as unhealthy upon each iteration. When operated conservatively, fewer data points may be dropped upon each iteration.

Figure 6:
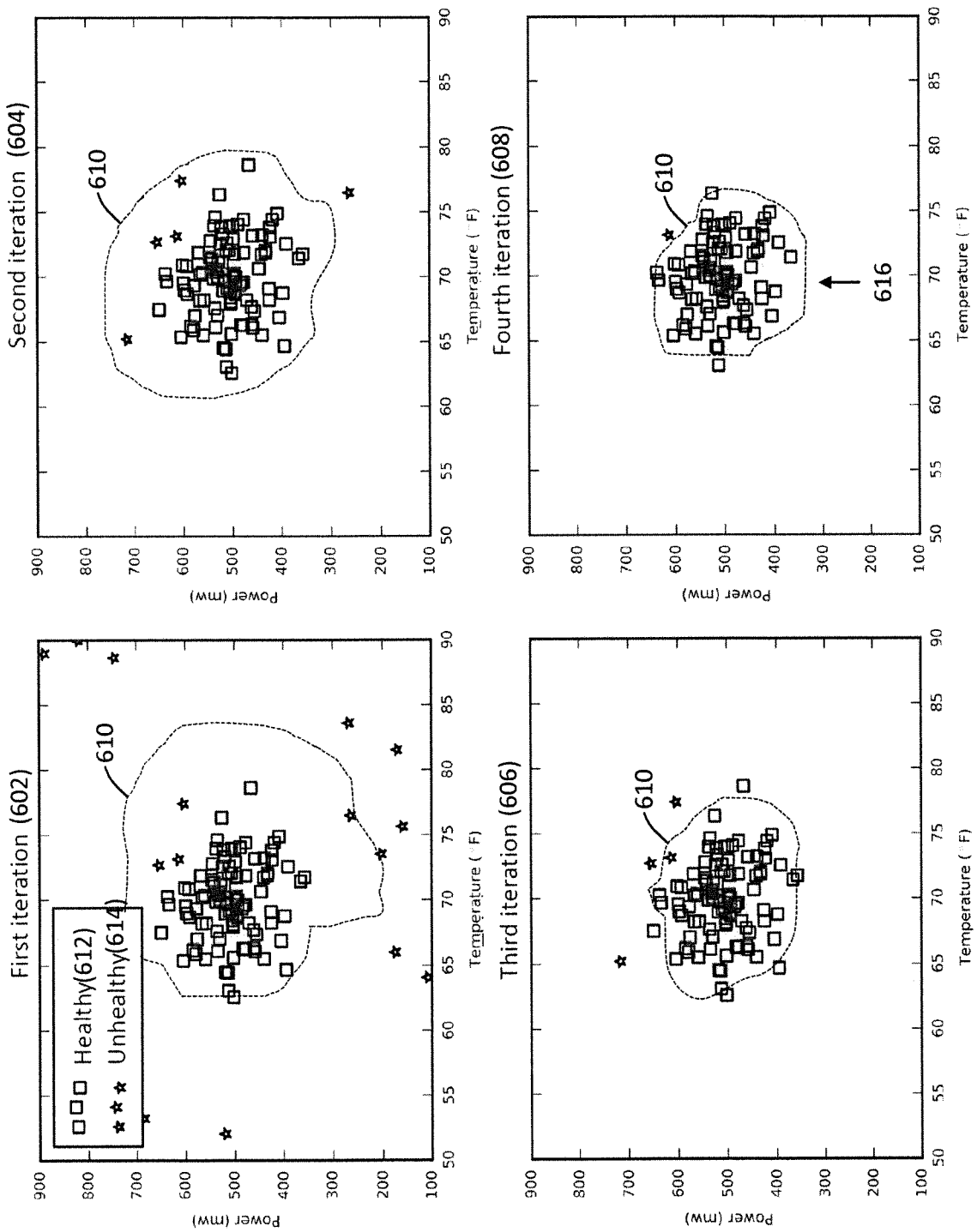
FIG. 6 comprises graphs showing the application of a data screening approach according to various embodiments of the present invention.

Referring now to FIG. 6, various iterations of recursively applying an unsupervised kernel-based screening algorithm to raw data are described. In this example, the samples represent power and temperature readings of an industrial machine. That is, at a particular temperature, a particular power reading is associated with that temperature.

As shown in FIG. 6, a first iteration 602 occurs, followed (in order), by a second iteration 604, a third iteration 606, and a fourth iteration 608. A hyperplane 610 separates data points. Samples that meet predetermined expectations ("nominal or healthy samples 612" and represented as squares) and samples that do not meet predetermined expectations ("anomalous or unhealthy samples 614" represented as stars) are shown.

It can be seen that with every successive iteration, the hyperplane 610 shape, placement, dimensions, and/or area are adjusted. The hyperplane 610 separates what are believed to be healthy samples 612 (in the interior of the polygon formed by the hyperplane 610) and unhealthy sample 614 (to the exterior of the polygon formed by the hyperplane 610). As successive iterations of the algorithm are performed, the polygon defined by the hyperplane 610 shrinks so that at the fourth iteration 608, only healthy data points are left in the interior of the polygon formed by the hyperplane 610. This set of remaining points is a healthy or good data set 616 defined by the hyperplane 610 after the fourth iteration 608 of the algorithm. The data set 616 can be used in model building.

It will be understood that the final data set 616 may, in fact, contain some unhealthy or bad data points. It will also be appreciated that some good data points may be excluded from the final data set 616 (i.e., these points may be to the exterior of polygon defined by the hyperplane 610).

Figure 7:
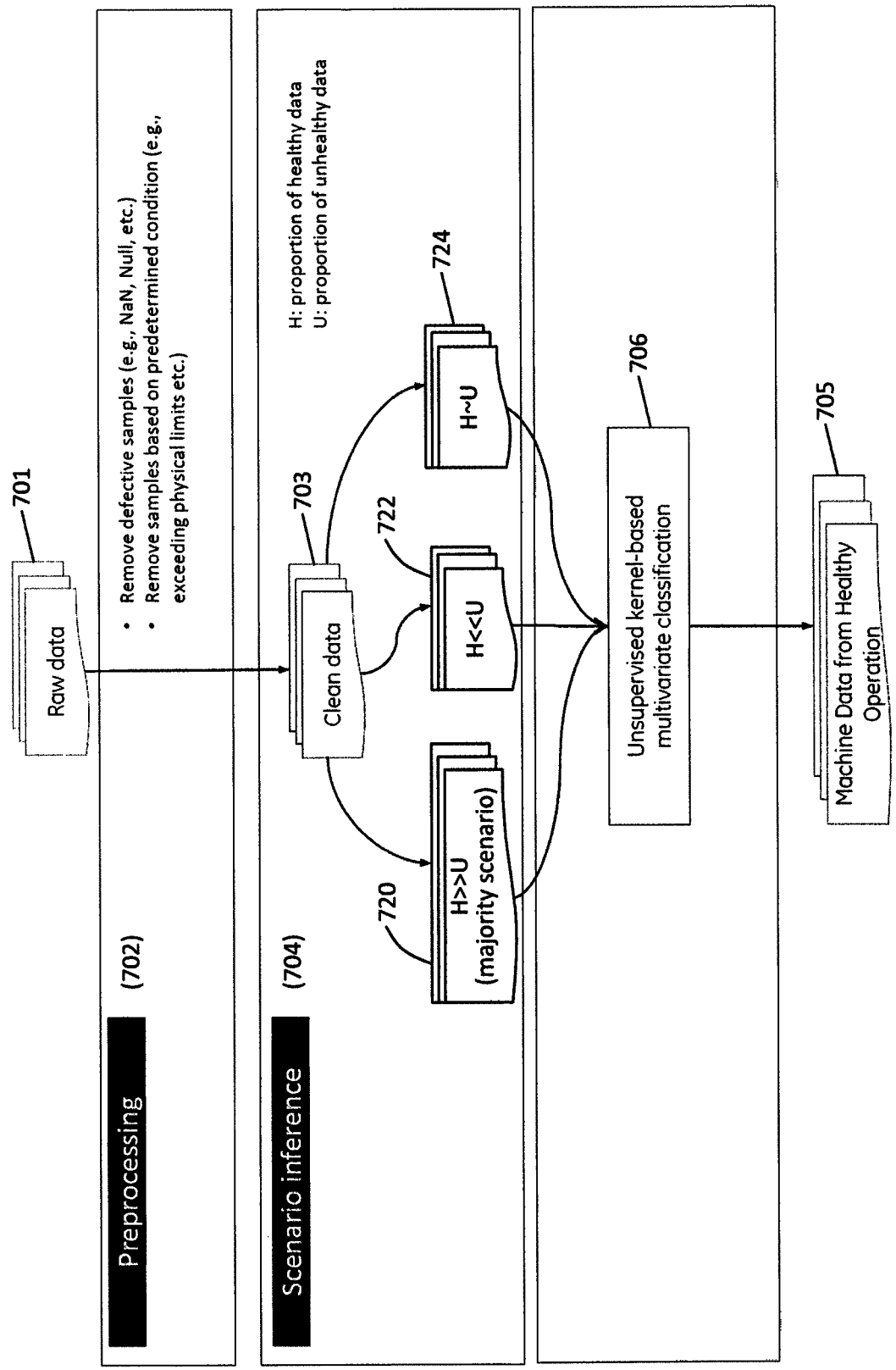
FIG. 7 comprises a flow chart of a data screening approach according to various embodiments of the present invention.

Referring now to FIG. 7, one example of a data screening approach is described. At step 702, raw data 701 is received and the raw data is pre-processed. In aspects, pre-processing can include removing defective samples (e.g., NaN, and Null samples), and removing samples based upon a predetermined condition (e.g., samples exceeding physical limits or values). Step 702 produces clean data set 703.

At step 704, scenario inference occurs. At this step, a scenario is inferred and good and bad data identified based upon the scenario. If H is the known (e.g., by a user) amount or proportion of healthy data and U is the known (e.g., by a user) amount or proportion of unhealthy data, three scenarios are possible. A first scenario 720 occurs when the amount of healthy data H is known to be much more (by a predetermined amount) than the amount of unhealthy data U. This scenario occurs most (e.g., the majority) of the time and the H and U data can be easily identified by the screening algorithm.

A second scenario 722 occurs when the known amount of healthy data H is much less (by a predetermined amount) the amount of unhealthy data U. This scenario may occur, for example, when it is known that the machine produced bad data for a predetermined amount of time (e.g., the machine produced bad data during the entire last month). A third scenario 724 occurs when the known amount of healthy data H is approximately the same as (within a predetermined amount) the amount of unhealthy data U. In the second and third scenarios 722 and 724, a user may enter known examples of nominal and/or anomalous (healthy and/or unhealthy) data. Once these are entered, an extrapolation algorithm may be used (as known to those skilled in the art) to determine whether data is healthy or unhealthy data.

At step 706, the screening algorithm is applied to the modified data set 703 (that has undergone the process of step 704 where U and H are identified). In aspects, an unsupervised kernel-based multivariate classification algorithm is applied (as described elsewhere herein) to produce machine data for healthy operation 705. The data 705 may be used by other algorithms and/or models to make predictions of machine operation.

It will be appreciated by those skilled in the art that modifications to the foregoing embodiments may be made in various aspects. Other variations clearly would also work, and are within the scope and spirit of the invention. It is deemed that the spirit and scope of the invention encompasses such modifications and alterations to the embodiments herein as would be apparent to one of ordinary skill in the art and familiar with the teachings of the present application.

What is claimed is:

1. A method, comprising:
receiving raw data from an industrial machine, the industrial machine including one or more sensors that obtain the data, the sensors transmitting the raw data to a central processing center;
receiving the raw data at the central processing center and recursively applying an unsupervised kernel-based algorithm to the raw data, the application of the unsupervised kernel-based algorithm being effective to learn characteristics of the raw data and to determine from the raw data a class of acceptable data, the class of acceptable data being data having a degree of confidence above a predetermined level that the data was obtained during a healthy operation of the machine, the acceptable data being successively determined and refined upon each application of the unsupervised kernel-based algorithm, the unsupervised kernel-based algorithm being executed until a condition is met, wherein the condition relates to a predetermined number of data points.

2. The method of claim 1, wherein the condition relates to a number of iterations, and the number of iterations is adjustable between a first number and a second number.

3. The method of claim 1, wherein the algorithm is a one-class SVM algorithm.

4. The method of claim 1, wherein the condition is an integer number of application times.

5. The method of claim 1, further comprising preprocessing the raw data before applying the unsupervised kernel-based algorithm.

6. The method of claim 1, further comprising accepting user limits concerning the raw data.

7. A method, comprising:
receiving raw data from an industrial machine, the industrial machine including one or more sensors that obtain the data, the sensors transmitting the raw data to a central processing center;
receiving the raw data at the central processing center and recursively applying an unsupervised kernel-based algorithm to the raw data, the application of the unsupervised kernel-based algorithm being effective to learn characteristics of the raw data and to determine from the raw data a class of acceptable data, the class of acceptable data being data having a degree of confidence above a predetermined level that the data was obtained during a healthy operation of the machine, the acceptable data being successively determined and refined upon each application of the unsupervised kernel-based algorithm, the unsupervised kernel-based algorithm being executed until a condition is met, and further comprising receiving user information concerning data viability that identifies at least some acceptable data.

8. The method of claim 7, further comprising preprocessing the raw data before applying the unsupervised kernel-based algorithm.

9. The method of claim 7, further comprising accepting user limits concerning the raw data.

10. The method of claim 7, wherein the algorithm is a one-class SVM algorithm.

11. The method of claim 7, wherein the condition is an integer number of application times.

12. The method of claim 7, wherein the condition relates to a number of iterations, and the number of iterations is adjustable between a first number and a second number.

13. An apparatus disposed at a central processing center, the apparatus comprising:
a receiver circuit that is configured to receive raw data from sensors at an industrial machine, the industrial machine including one or more sensors that obtain the data;
a data storage device coupled to the receiver circuit, the data storage device configured to store the raw data;
a control circuit coupled to the data storage device and the receiver circuit, the control circuit configured to receive the raw data and to recursively apply an unsupervised kernel-based algorithm to the raw data, the application of the unsupervised kernel-based algorithm being effective to learn characteristics of the raw data and to determine from the raw data a class of acceptable data, the class of acceptable data being data having a degree of confidence above a predetermined level that the data was obtained during a healthy operation of the machine, the acceptable data being successively determined and refined upon each application of the unsupervised kernel-based algorithm, the unsupervised kernel-based algorithm being executed until a condition is met, wherein the condition relates to a predetermined number of data points.

14. The apparatus of claim 13, wherein the condition relates to a number of iterations, and the number of iterations is adjustable between a first number and a second number.

15. The apparatus of claim 13, wherein the algorithm is a one-class SVM algorithm.

16. The apparatus of claim 13, wherein the condition is an integer number of application times.

17. The apparatus of claim 13, wherein the control circuit is further configured to preprocess the raw data before applying the unsupervised kernel-based algorithm.

18. The apparatus of claim 13, wherein the receiver circuit is further configured to accept user limits concerning the raw data.

19. An apparatus disposed at a central processing center, the apparatus comprising:
a receiver circuit that is configured to receive raw data from sensors at an industrial machine, the industrial machine including one or more sensors that obtain the data;
a data storage device coupled to the receiver circuit, the data storage device configured to store the raw data;
a control circuit coupled to the data storage device and the receiver circuit, the control circuit configured to receive the raw data and to recursively apply an unsupervised kernel-based algorithm to the raw data, the application of the unsupervised kernel-based algorithm being effective to learn characteristics of the raw data and to determine from the raw data a class of acceptable data, the class of acceptable data being data having a degree of confidence above a predetermined level that the data was obtained during a healthy operation of the machine, the acceptable data being successively determined and refined upon each application of the unsupervised kernel-based algorithm, the unsupervised kernel-based algorithm being executed until a condition is met, wherein the receiver circuit is further configured to receive user information concerning data viability that identifies at least some acceptable data.

20. The apparatus of claim 19, wherein the control circuit is further configured to preprocess the raw data before applying the unsupervised kernel-based algorithm.

21. The apparatus of claim 19, wherein the receiver circuit is further configured to accept user limits concerning the raw data.

22. The apparatus of claim 19, wherein the algorithm is a one-class SVM algorithm.

23. The apparatus of claim 19, wherein the condition is an integer number of application times.

24. The apparatus of claim 19, wherein the condition relates to a number of iterations, and the number of iterations is adjustable between a first number and a second number.

* * * * *